US009046000B2

(12) United States Patent
Kominsky

(10) Patent No.: US 9,046,000 B2
(45) Date of Patent: Jun. 2, 2015

(54) METHOD FOR DETECTING FOREIGN OBJECT DAMAGE IN TURBOMACHINERY

(75) Inventor: Daniel Kominsky, Christiansburg, VA (US)

(73) Assignee: Prime Photonics, LC, Blacksburg, VA (US)

( * ) Notice: Subject to any disclaimer, the term of this patent is extended or adjusted under 35 U.S.C. 154(b) by 754 days.

(21) Appl. No.: 13/525,584

(22) Filed: Jun. 18, 2012

(65) Prior Publication Data

US 2013/0006541 A1    Jan. 3, 2013

Related U.S. Application Data

(60) Provisional application No. 61/520,948, filed on Jun. 18, 2011, provisional application No. 61/520,953, filed on Jun. 18, 2011.

(51) Int. Cl.
*F01D 21/00*    (2006.01)
*G05B 23/02*    (2006.01)

(52) U.S. Cl.
CPC ............ *F01D 21/003* (2013.01); *Y02T 50/671* (2013.01); *F05D 2260/80* (2013.01); *G05B 23/024* (2013.01)

(58) Field of Classification Search
CPC ......... F01D 21/003; F01D 5/00; F01D 5/286; F01D 17/02; F05D 2260/80; F05D 2260/95; F05D 2270/804; G01N 21/55; G01N 21/88; G01N 22/02; G01N 2021/9546; G01N 2223/646; G01N 2291/2693; G01N 23/02; G01N 23/04; G01N 27/60; G01N 29/4472; G06F 17/00; G05B 23/024; G06T 7/0004; Y02T 50/671; Y02T 50/673
USPC ........ 702/34–35, 150, 152; 356/237.1–237.2, 356/445, 600; 382/141, 154
See application file for complete search history.

(56) References Cited

U.S. PATENT DOCUMENTS 4,573,358 A    3/1986    Luongo
4,896,537 A    1/1990    Osborne
(Continued)

OTHER PUBLICATIONS

Yadav et al., Automatic Fault Diagnosis of Internal Combustion Engine Based on Spectrogram and Artificial Neural Network, Apr. 11, 2010, ROCOM' 10 Proceedings of the 10th WSEAS International Conference on Robotics, Control and Manufacturing Technology, pp. 101-107.*

(Continued)

*Primary Examiner* — Toan Le
(74) *Attorney, Agent, or Firm* — New River Valley IP Law, PC; Michele L. Mayberry

(57) ABSTRACT

The present invention relates to systems and methods for real-time health monitoring of engines to monitor turbomachinery blades during engine operation and report anomalous behavior and shape of the blades if it occurs, such as damage by FOD. The system includes sensor(s) for obtaining a blade reflection profile from a blade passing by the sensor(s) during a revolution of the rotor in combination with a processor for performing timing calculations and/or fingerprint comparisons with reference data to identify a change in blade fingerprint relative to the reference data, which may indicate blade damage. Such systems can reduce operational costs, enhance safety and improve operational readiness by facilitating condition-based maintenance of engine rotors as opposed to schedule-based solutions. The invention can prevent the needless loss of life and assets caused by undetected minor levels of blade damage that may lead to unexpected catastrophic failure of an engine.

17 Claims, 10 Drawing Sheets

(56) References Cited

U.S. PATENT DOCUMENTS

| | | |
|---|---|---|
| 4,955,269 A | 9/1990 | Kendig et al. |
| 5,353,551 A | 10/1994 | Nishida |
| 6,499,350 B1 | 12/2002 | Board et al. |
| 6,785,635 B2 | 8/2004 | Von Flotow |
| 7,455,495 B2 | 11/2008 | Leogrande et al. |
| 7,509,862 B2 | 3/2009 | Cohen et al. |
| 7,824,147 B2 | 11/2010 | Morris et al. |
| 7,887,292 B2 | 2/2011 | Kuehlmeier |
| 7,941,281 B2 | 5/2011 | Rai et al. |
| 8,164,761 B2 | 4/2012 | Kominsky |
| 2005/0036135 A1* | 2/2005 | Earthman et al. .......... 356/237.1 |
| 2007/0132461 A1 | 6/2007 | Holmquist et al. |
| 2010/0177299 A1 | 7/2010 | Kominsky |
| 2011/0010108 A1 | 1/2011 | Bhattacharya et al. |
| 2011/0041474 A1 | 2/2011 | Gerez et al. |
| 2011/0098948 A1 | 4/2011 | Platt et al. |
| 2011/0178772 A1 | 7/2011 | Gerez et al. |
| 2011/0211200 A1 | 9/2011 | Cribbs |
| 2011/0231171 A1 | 9/2011 | Jousselin |
| 2011/0293403 A1 | 12/2011 | Badami |
| 2012/0035861 A1 | 2/2012 | Hadley et al. |
| 2012/0053851 A1 | 3/2012 | Baller et al. |

OTHER PUBLICATIONS

Abstract of Yadav et al. reference, Apr. 11, 2010, 1 pp.*
"Non-Intrusive Stress Measurement Systems", Agilis Measurement Systems, Inc., Available before Jun. 18, 2012.
Cohen, Eric D., "Vibration Detection in Turbomachinery Using Non-Contacting Sensors", Dept. of Electrical Engineering and Computer Science, Massachusetts Institute of Technology, May 26, 2006.
Szczepanik, Ryszard, et al., "Application of Blade-Tip Sensors to Blade-Vibration Monitoring in Gas Turbines", Thermal Power Plants, Jan. 13, 2012, p. 145-176.
Zimmer, Aline K., "Investigation of the Impact of Turbine Blade Geometry on Near-Field Microwave Blade Tip Time of Arrival Measurements", Daniel Guggenheim School of Aerospace Engineering, Georgia Institute of Technology, Dec. 2008.

* cited by examiner

Plot profiles of a blade on two revolutions and the following blade.

Blade alignment and fingerprint analysis.

Schematic showing numbered blades of rotor and stationary point of measurement.

Sample reflection fingerprint showing extraction of features.

Definition of timing features.

Graphical representation of timing references analyzed.

Mathematical process of forming a spectrogram.

Spectrograms for the time evolution of the centroid timing for each test condition.

METHOD FOR DETECTING FOREIGN OBJECT DAMAGE IN TURBOMACHINERY

CROSS-REFERENCE TO RELATED APPLICATIONS

This application relies on the disclosure of and claims priority to and the benefit of the filing date of U.S. Provisional Application Nos. 61/520,948 and 61/520,953, filed Jun. 18, 2011, the disclosures of which are hereby incorporated by reference herein in their entireties.

STATEMENT OF GOVERNMENT INTEREST

This invention was supported by the U.S. Navy under Contract No. N68335-11-C-0061. The U.S. Government has certain rights in this invention.

BACKGROUND OF THE INVENTION

1. Field of the Invention

The present invention relates to sensors for identifying blade damage in turbine engines. Embodiments of the invention provide systems and methods for detecting and/or identifying damage to turbomachinery blades, such as foreign object damage (FOD). Such systems are capable of detecting blade damage while the rotor is running and can drive a condition based maintenance approach to engines providing a cost savings as compared with traditional schedule based approaches.

2. Description of Related Art

US military fixed and rotary wing aircraft are increasingly being required to reliably operate in harsh environments and within more demanding operational envelopes. Foreign Object Damage (FOD) to gas turbine engines can result when debris is ingested by the engine which can compromise engine operation and safety. Harmful debris is typically categorized as originating either from a domestic object (part of the engine dislodging, such as a screw) or a foreign object (an object not part of the engine, for example, a bird).

Foreign object damage (FOD) is the primary driver for unscheduled engine removals in the current military fleet environment. To maintain affordability and fleet readiness, there is a need for identifying the FOD event and location and the magnitude of the FOD damage must be assessed while the engine is still on wing. It is important to note that the principal reason for performing FOD inspections is to detect small levels of damage before subsequent usage can cause that damage to expand into a serious risk of engine failure. The worst case scenario for the current method of inspection is for a minor FOD event to have gone undetected, due to a lack of inspection based on schedule or failure to detect the damage, and then result in a later failure of the engine causing loss of life or total loss of the asset.

There is currently a lack of reliable instrumentation which can provide data about noncatastrophic FOD without an extended examination by a highly skilled technician. Current methods require a detailed visual inspection either through engine disassembly or with a borescope. Such a process becomes increasingly difficult as engines and airframes become more and more integrated, as the access to necessary points on the engine becomes limited. Further, without knowing that a FOD event has occurred, there is no way to determine the optimal points in time at which an engine should be inspected. This leads to the inefficient schedule-based maintenance approach where all engines, regardless of potential damage, are inspected on a regular basis in the hopes of identifying blade damage early so that it can be corrected before engine failure. As a result, this constitutes a time consuming and very expensive approach toward obtaining the needed information. Real-time condition monitoring of FOD in gas turbine engines is thus highly desired.

There are a variety of methods currently used for FOD detection. Some methods analyze stress or ultrasound wave signals, others analyze reflected light and microwave signals, and still others measure and analyze eddy currents and discharge pressure. Such methods may use timing as a central concept of the algorithm, while others use static data, i.e., data that does not have a time component. Methods that are time-based typically use specific timing features as a parameter to determine another metric such as vibration or stagger angle, which may be representative of FOD. A disadvantage of existing FOD detection systems is they often have complex hardware components leading to increased weight and implementation costs.

One existing approach is disclosed in U.S. Published Patent Application, Publication No. 2011/0041474, entitled "Method and System for Detecting the Ingestion of an Object by an Aircraft Turbine Engine During a Mission." This approach uses a digital camera to take pictures of the turbine blades at a rate comparable to the rate of revolution. The digital photographs are then processed and compared to photographs of the blades from previous revolutions. Should the processing algorithm realize a difference in the photographs, the system alerts the end user that FOD has been detected.

Other existing methods of identifying FOD are disclosed in U.S. Published Patent Application, Publication No. 2012/0035861, entitled "Blade Monitoring System." This approach uses one or more laser probes, magnetic sensors, capacitive sensors, microwave sensors, or an eddy current sensor to sense the passing of blades. The signals obtained by the sensors are then passed through a network of analog signal splitters and analog-to-digital converters, after which the signals from the converter outputs are analyzed. The signal waveforms, measured on a time scale, are analyzed using techniques including the calculation of interpolated threshold crossings, average threshold crossings, a centroid of the pulse, time of arrival, and the change of time of arrival. The system also senses and receives a timing reference which is used to calculate the time of arrival, and receives a stored expected time of arrival which is used to calculate the change of time of arrival. The change of time of arrival is then used to determine natural frequency, vibration, and static lean angle as a means to determine blade damage.

Another approach is disclosed in U.S. Pat. No. 7,941,281, entitled "System and Method for Rotor Blade Health Monitoring." This approach uses time of arrival sensors to obtain signals indicative of the times of arrival of rotating rotor blades. The signals are then used to determine one or more features of the blades including static and dynamic deflection, clearance, blades twist profile, frequency detuning during operation. These features are then used by a physics and reliability modeler to estimate rotor blade crack length, rotor blade crack propagation time, and probability of rotor blade crack. The data is then used by a decision level fuser to determine the health of the rotating rotor blades.

The approaches of such systems and methods lack one or more of reliability, accuracy, and sensitivity in detecting the presence of damaged blades. What is needed is an accurate and reliable approach capable of detecting even very minor levels of blade damage. Such techniques would include the incorporation of one or more of: a unique blade fingerprint analysis method, use of more reliable timing differencing techniques, reliance on unique timing features, and the performance of one or more complex statistical analyses on the data, such as Short Time Fourier Transform to produce spectrograms.

SUMMARY OF THE INVENTION

To this end, features, advantages, and benefits of the invention include:

real-time detection of FOD, which eliminates the cost of and reduces the number of scheduled visual inspections;

multiple redundant FOD detection methods, which provides greater confidence and high reliability in results;

probe multi-functionality, where the same front end hardware can be used to obtain data on one or more of blade features, such as tachometry, blade clearance, and blade time of arrival (based on rising edge, FWHM, and/or centroid measurements from a signal) and the combined functionality means that more data can be obtained, resulting in lower weight, fewer engine penetrations, and simpler systems;

optical interrogation providing inherently high resolution, where the sensors can detect smaller features than other technologies;

native blade identification (ID), in which the system independently identifies individual blades for enabling historical trend analysis; and versatility—the system is compatible with metallic or nonmetallic blades, and whereby a single technology for many platforms reduces cost.

Objects of the invention specifically provide systems and methods for detecting blade damage and identifying the location and severity of the damage. As used in the context of this specification, blade damage can include any type of damage whether by foreign objects or domestic object damage. For simplicity, in the context of this specification, the terms damage, blade damage, foreign object damage (FOD), and domestic object damage may be used interchangeably and referred to generally as damage or FOD.

Specific advantages of systems and methods of the invention include the capability of detecting and localizing even extremely minor levels of FOD.

One goal provided by aspects of the invention is the accurate identification of the location of the FOD through multiple, independent data analysis pathways.

In embodiments, blade damage can be identified without the use of any form of external once-per-revolution (OPR) sensor or any supplemental instrumentation.

The systems can also act to provide additional forms of data that would normally require additional instrumentation as well, such as clearance sensors, OPR sensors, NSMS (Non-contact Stress Management System) probes, etc.

Typically, systems of the invention comprise high temperature optical-based sensors that are permanently installed on the turbine engine to detect, localize and assess FOD through one or more, and multiple independent methods of analysis.

For example, specifically provided are systems and methods for identifying a change in blade fingerprint indicative of blade damage. The systems and methods can comprise: (a) one or more sensors for obtaining a signal representing a blade reflection profile from one or more blades passing by the sensors during one or more revolutions of a rotor comprising the blades; (b) at least one computer-readable storage medium in operable communication with the sensors for storing the blade reflection profiles as test data; and (c) a processor in operable communication with the storage medium, where the processor is operably configured to: (i) prepare test data for comparison with reference data; (ii) align the test data with the reference data by blade; (iii) differencing the reference data and the test data to obtain residuals (i.e., the difference between the data sets at each data point being compared, whether subtracting the test data from the reference data or subtracting the reference data from the test data); and (iv) calculate total error from the residuals to identify a change in blade fingerprint indicative of blade damage.

In the context of this specification, a blade can be any blade found in a turbine engine, including but not limited to compressor blades, fan blades, and turbine blades. Thus, when referring to blades or blades of a turbine in the context of this specification it is intended to include any rotating blade that may be present in turbomachinery. Further, for example, rotors of an automotive turbocharger are included. Blades are typically associated with a rotor in any turbomachinery. It is not important in the context of this invention whether the blades are separate entities and attached to the rotor or whether the blades and the rotor are a single manufactured piece, i.e., integral with one another. Thus, when referring to a blade as being attached to, disposed on, disposed in, or of the rotor, it is also intended to incorporate blades integral with the rotor, as well as the reverse. In general, as used in this specification, the rotor comprises the blades whether attached to the rotor or integral thereto.

One way to prepare the test data for comparison with reference data is by performing one or more of thresholding, interpolating, normalizing the test data to a fixed height, and averaging the data over a number of revolutions. According to aspects of the invention, the thresholding process comprises isolating the blade reflection profiles from background noise, such as by isolating signals having values greater than a selected level.

In embodiments, interpolating comprises adjusting the test data to correct for pulse compression or dilation (such as would result from changes in blade speed), and/or compressing the test data into a summary data set comprising a fixed number of test data.

Specific features can be identified in the test data and measured for comparison to the reference data. This is referred to as facial recognition.

Optionally, the system aligns, by blade, the test data with the reference data by identifying blade numbers using a one-per-revolution (OPR) sensor. Preferred embodiments, however, have no need to employ an OPR sensor.

The reference data can be updated from time to time with test data that is different from the reference data to reflect change(s) in blade state. The reference data can comprise historical data obtained previous in time to obtaining the test data. Alternatively, especially in cases where blade instability is monitored, the reference data can comprise data obtained previous and/or subsequent in time to and within a selected window of time of obtaining the test data. In embodiments, the selected window of time of obtaining the test data comprises a time period characterized by nominally unchanged rotor operating conditions.

The processor can further comprise means for combining or comparing the corrected test data with reference data to identify a change in the blade reflection profile indicative of blade damage. Such a processor further comprises the means for: (a) correlating the corrected data set against reference data to obtain a correlation coefficient and identify blade offset for one or more blades using the aggregate correlation:

$$R_{m,n} = \sum_{i=1}^{nVal} \text{Corr}(sig_{m+i}, ref_{n+i})$$

where the correlation function is defined as:

$$\text{corr}(X, Y) = \frac{\text{cov}(X, Y)}{\sigma x, \sigma y} = \frac{E[(X - \mu X)(Y - \mu y)]}{\sigma x, \sigma y},$$

where E is the expected value operator, where $\mu_x$, and $\mu_y$ are the expected values (averages), and $\sigma_x$, $\sigma_y$ are the standard deviations of data sets X, and Y respectively; and correcting the test data for blade offset by adjusting blade numbers of the test data to align with blade numbers of the reference data and to obtain corrected test data. This equation describes how the similarity of each pair of blades is combined to come up with an overall statistic for identifying blades.

According to some methods and systems of the invention, calculating the total error comprises squaring and summing the residuals and/or summing the absolute value of the residuals, where a value greater than zero indicates blade damage.

Other embodiments may comprise a processor operably configured for: (a) determining from a blade pulse of a target blade one or more of: (i) an absolute time of pulse rising edge, (ii) an absolute time of a center of FWHM distribution, and (iii) an absolute time of pulse centroid; (b) calculating a difference between any of (i)-(iii) of the target blade and that of one or more of: (iv) a previous blade, (v) the target blade on a previous revolution, and (vi) an expected time of the target blade in a particular revolution based on the average absolute times of all other blades in that revolution; and analyzing the difference(s) to identify blade damage.

In such methods and systems, analyzing the difference to identify blade damage can comprise using one or more statistical measures chosen from mean, median, variance, kurtosis, skewness, and short time Fourier transform (STFT) analysis.

Embodiments of the present invention further provide a system for identifying damage of a blade comprising: one or more sensors for sensing a blade pulse from one or more blades passing by the sensors during one or more revolutions; at least one computer-readable storage medium in operable communication with the sensors for storing data associated with the blade pulses; a processor in operable communication with the storage medium for performing short time Fourier transform (STFT) analysis of the data to obtain a series of spectrograms and for comparing one or more spectrograms in the series to identify spectrograms with wider and less distinct frequency bands than a previous spectrogram, or regions of smoothness in a spectrogram not present in a previous spectrogram, either being indicative of blade damage.

Within the scope of the invention, computer programs for performing the methods according to embodiments of the invention are also included and can be incorporated into systems of the invention. For example, included is a computer program embodied in a computer-readable storage medium, which when executed, enables a computer to perform a method for identifying a change in blade fingerprint indicative of blade damage, the method comprising: (a) preparing test data for comparison with reference data, where the test data comprises signals representing blade reflection profiles obtained from one or more blades passing by one or more sensors during one or more revolutions of a rotor comprising the blades (whether the blades are attached or integral with the rotor); (b) normalizing the test data to a fixed height; (c) aligning, by blade, the test data with the reference data; (d) differencing the reference data and the test data to obtain residuals; and (e) calculating total error from the residuals to identify a change in blade fingerprint indicative of blade damage.

Such embodiments can comprise implementation of any one or more of these method steps in any order. Indeed, in any method, system, or software disclosed in this specification, each of the elements specified is optional for certain embodiments of the invention. It is important to note that although a particular embodiment may be characterized as a "system," or a "method," or "software," in this specification, each description is intended to encompass each of these statutory classes of invention and the label provided herein should not be restrictive. For example, if a method is identified in this specification, it is intended that the method steps listed for that method can also be incorporated into systems running those methods and/or into software for implementing those methods.

The present invention also provides a method for identifying a change in blade fingerprint (e.g., of a turbine blade) indicative of blade damage, the method comprising: (a) preparing test data for comparison with reference data, where the test data comprises signals representing blade reflection profiles obtained from one or more turbine blades passing by one or more sensors during one or more revolutions of a rotor comprising the blades; (b) normalizing the test data to a fixed height; (c) aligning, by blade, the test data with the reference data; (d) differencing the reference data and the test data to obtain residuals; and (e) calculating total error from the residuals to identify a change in blade fingerprint indicative of blade damage.

Further provided in embodiments is a system for identifying blade damage comprising one or more sensors for sensing a blade pulse from one or more blades passing by the sensors during one or more revolutions; at least one computer-readable storage medium in operable communication with the sensors for storing the blade pulses; a processor in operable communication with the storage medium for: (a) determining from a blade pulse of a target blade an absolute time of a center of FWHM distribution, and calculating a difference between that of the target blade and that of at least one of: (i) a previous blade, (ii) the target blade on a previous revolution, and (iii) an expected time of the target blade in a particular revolution based on the average absolute times of all other blades in that revolution; and/or (b) determining from a blade pulse of a target blade an absolute time of pulse centroid, and calculating a difference between that of the target blade and that of at least one of: (i) a previous blade, or (ii) the target blade on a previous revolution; and (c) analyzing the difference(s) to identify blade damage.

BRIEF DESCRIPTION OF THE DRAWINGS

The accompanying drawings illustrate certain aspects of some embodiments of the present invention, and should not be used to limit or define the invention. Together with the written description the drawings serve to explain certain principles of the invention.

DETAILED DESCRIPTION OF VARIOUS EMBODIMENTS OF THE INVENTION

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

Example I

Turbine Blade Fingerprint Analysis

Blade damage can be categorized using a spectrum that ranges from cosmetic changes in the blade surface, increasing to minor levels of damage, then moderate damage, and ultimately rising to the level of severe blade damage potentially leading to or resulting in catastrophic engine failure. In some situations, damage even to a single blade if sufficiently severe, can cause cascading failure through the entire engine, leading to immediate engine inoperability.

Objects of the invention provide systems and methods capable of identifying many varied levels of turbine blade damage. The systems and methods of the present invention, however, are best suited for identifying intermediate levels of blade damage, including micro, minor, or moderate levels of blade damage. In the context of this invention, there is little value in identifying cosmetic changes, which are rarely important with respect to blade function, and little value in identifying catastrophic changes, which is often too late to rectify before engine failure. In contrast, the importance in identifying intermediate levels of blade damage is that blade performance can be better evaluated and blade/rotor lifetime extended. Systems of the invention can identify and characterize compressor rotor blade damage due to single FOD events as well as more gradual degradation due to continual small-scale FOD exposure.

Figure 1:
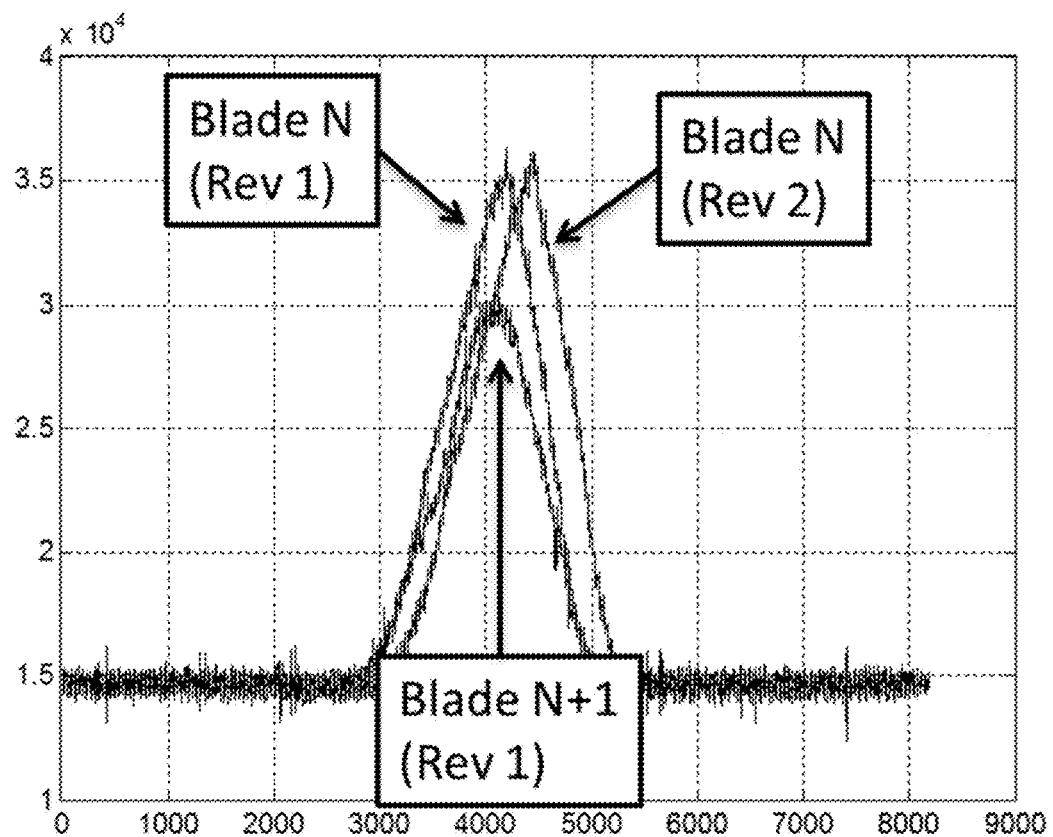
FIG. 1 is a graph providing a collection of plot profiles of a blade on two revolutions and the following blade.

Principles of various aspects of the invention are based on the understanding that no rotor has blades which are identical to each other, because no physical system can be fabricated which is so uniform as to lack any form of identifying features. Further, slight variations in machining, blade wear such as scratches, and discoloration of the blades result in a set of distinguishing reflectivity "fingerprints" which can be used to identify a particular blade. An example of this is illustrated in FIG. 1, which shows the similarity between successive sensor passings of a randomly selected blade along with the fingerprint of the blade which follows the randomly selected blade. Even casual inspection reveals the morphological similarity of the blade profile which repeats itself when compared to the other blade.

Embodiments of the present invention generally employ one or more sensors for obtaining a signal from blades passing by the sensor during revolutions of the rotor comprising the blades. The signal received as a result of the light reflected from the blade is referred to as the blade reflection profile, pulse, or fingerprint. The sensor(s) comprises a light source that emits a light beam toward blades rotating on a rotor. The light is reflected from each blade as the blades pass through the beam of light, and the light is directed back to the sensor for detection as a blade reflection profile (a unique pulse for each blade).

As a blade is damaged by one or more FOD events, the blade reflection profile for that blade will change. That is the light reflected from the healthy blade will have a different pulse pattern than that of light reflected from the damaged blade. Blade reflection profiles from one run can be compared with data stored from previous runs and/or data from subsequent runs to determine if there is a change in blade fingerprint and if that change is indicative that damage to the blade has occurred, or that the blade is unstable.

The systems of the invention can use hardware and software capable of identifying the particular location and magnitude of FOD. In preferred embodiments, optical sensor instrumentation can be used for obtaining the data needed to make the determinations under the invention. For example, the technology disclosed in U.S. Pat. No. 8,164,761 issued Apr. 24, 2012 and entitled "Differential Focus Blade Clearance Probe and Methods for Using Same," and disclosed in US Published Application No. 2010/0177299, entitled "Differential Focus Blade Clearance Probe," published Jul. 15, 2010, would provide a sufficient platform for performing aspects of embodiments of this invention as well. The disclosures of these publications are hereby relied on and incorporated by reference herein in their entireties.

Figure 2:
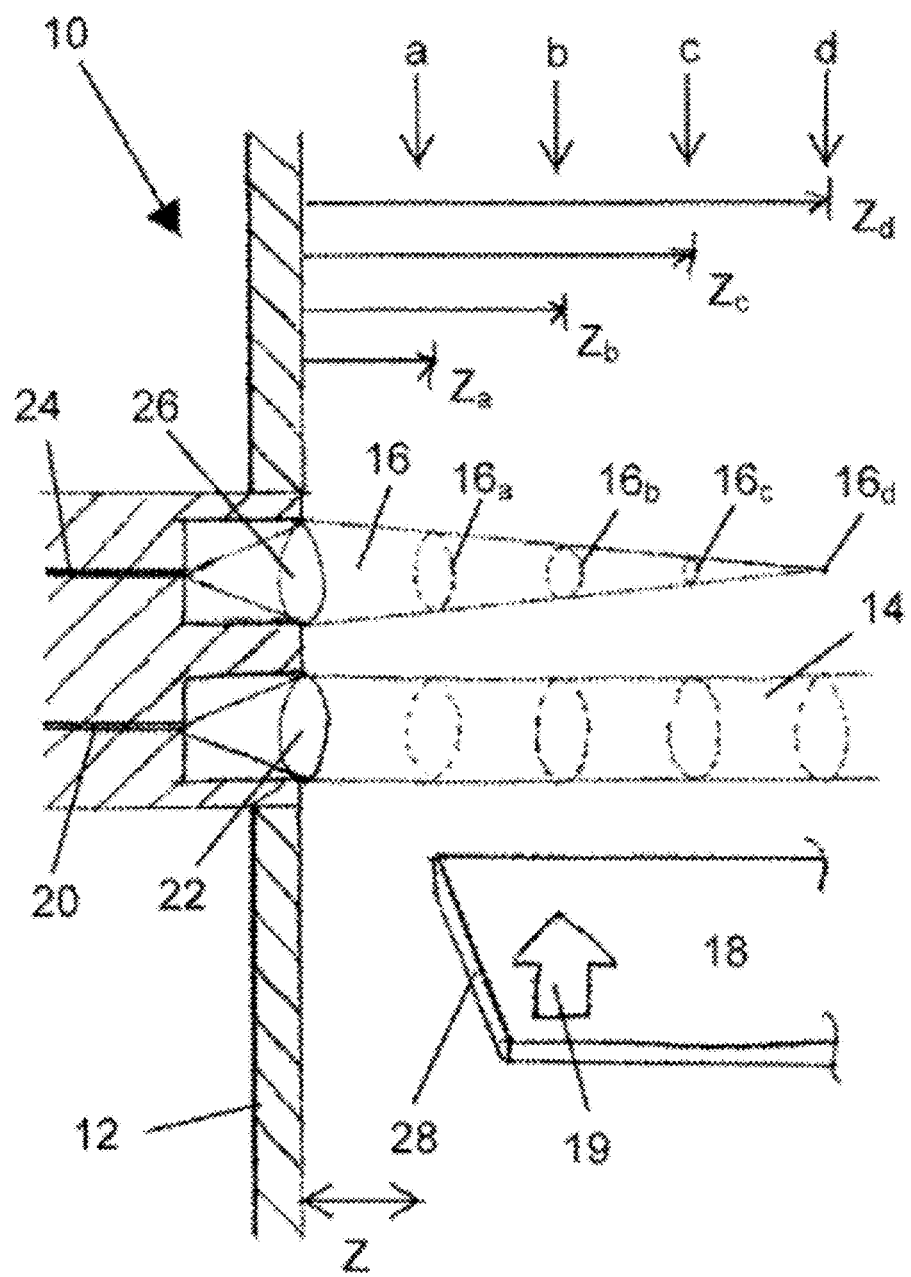
FIG. 2 is a schematic drawing providing a cross-sectional view of an embodiment of a representative sensor of the present invention.

Preferred embodiments of the present invention comprise remote, non-contact optical probes operably configured to collect and detect blade pulses from light reflected off the blade passing through the light beam of a sensor. FIG. 2 provides an illustration of a representative sensor 10 of the invention comprising one or more light source for providing one or more light beam 14, 16 and a detector (not shown).

Lens 22, 26 can be included in the sensor for providing light beam 14, 16 in a desired manner, such as collimated, converging, or diverging. The lens(es) are optional. Light beam 16 in combination with lens 26, for example, provides a converging beam that can have a change in diameter 16a-d along the length of the beam. Light beam 14 in combination with lens 22 provides a collimated beam. Embodiments may also comprise a light beam and lens which together are operably configured to provide a diverging beam of light.

Any number of light sources and types of light sources can be used. For example, systems of the invention may comprise a single collimated beam of light, or a single diverging beam, or a single converging beam. Alternatively, systems of the invention can comprise two light beams, one a diverging beam and the other collimated. Even further for example, the systems may comprise three or more light beams, with any combination and number of converging, diverging, or collimated beams.

The sensors can optionally comprise optical fiber 20, 24 for delivering the light beam 14, 16 generated from the light source to a particular location proximate the location where the blades 18 are rotating within engine case or shroud 12. As shown, light is produced from the light source, propagated along optical fiber 20, 24 and through lens 22, 26. Once the light beam 14, 16 contacts blades 18, the light is reflected back to a detector, optionally propagated along the same or different optical fiber to the detector. A multi-core optical fiber can be used where light is delivered to the surface of the blade using a first fiber and then is reflected and returned through a second fiber which is disposed concentrically to the first fiber.

In preferred embodiments, sensors can include optical sensors. Other types of sensors may also be used and can comprise any type of light source. Preferably, light with narrowed frequency ranges, such as light produced by lasers or diodes, is used. Broad band light sources can also be used. Similarly, electromagnetic waves in the invisible or visible ranges can be used. The terms "light," "light sources," "beam," "light beams" or similar terms include electromagnetic waves or a ray of electromagnetic waves in the invisible and visible ranges, and can be either coherent or incoherent.

Figure 3:
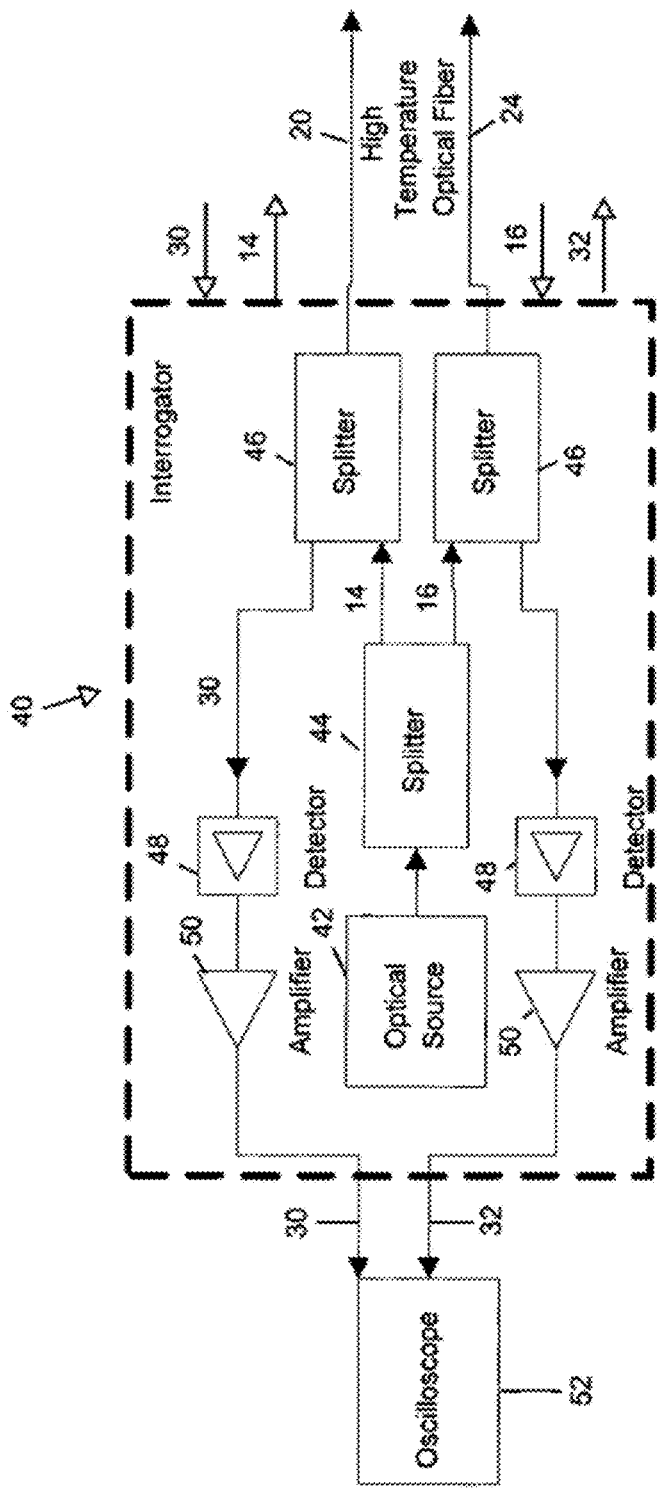
FIG. 3 is a schematic drawing of the optical and electrical system operating a sensor of the present invention.

FIG. 3 provides a schematic diagram illustrating how the components of a system of the invention can operate together. Although this example provides a system with multiple light sources, embodiments can also comprise a single light source operably configured in a similar manner. As shown, the system 40 can be operably configured to transmit light, to receive reflected light pulses and to process the reflected light pulses. The system comprises optical source 42, which can emit light in narrow or broad ranges in the visible or invisible range, as discussed above. In embodiments where multiple light beams are used, light from the optical source(s) 42 is split by splitter 44 into two or more beams to be transported along optical fibers 20 and 24 to sensor 10, as shown in FIG. 2. Alternative configurations include independent light sources for each channel as the input to splitter 46. Reflected light pulses 30, 32 are transported in the opposite direction back through optical fibers 20 and 24. Each reflected pulse 30, 32 then travels through splitter 46 to separate from beam 14, 16, respectively. Each reflected pulse is optionally optically amplified to increase the signal strength. Each reflected pulse 30, 32 is detected by optical detector 48 to convert the optical signal to electrical signals for data processing by electrical and electronic components. The converted electrical signals are optionally amplified by amplifier or op-amp 50 to increase their magnitudes or gains. These signals are also optionally conditioned through the use of electronic filters. In one embodiment, pulses 30 and 32 are viewed at oscilloscope 52, where desired features of the pulses (such as blade time of arrival based on rising edge, FWHM, and/or centroid measurements from a signal) can be stored, viewed, and analyzed. When sensor 10 and system 40 are used to measure features of multiple moving or rotating objects, such as blades inside a jet engine, turbo charger or turbo machinery, the pulses from each blade can be stored in memory for processing or post-processing.

It is important to note that embodiments of the present invention can be used in any context where it is desired to evaluate the features of any moving or rotating object. Of particular interest, the methods and systems disclosed herein are useful in analyzing the features of any blade in a turbine engine, including but not limited to compressor blades, fan blades, and turbine blades. Thus, when referring to blades or blades of a turbine in the context of this specification it is intended to include any rotating blade that may be present in turbomachinery. Further, for example, rotors of an automotive turbocharger are included.

Now having described various features of the system that can be used to collect the blade reflection data, an example demonstrating how information obtained from the sensor(s) can be used to identify whether a blade has been damaged is provided.

More particularly, embodiments of the invention provide a system for identifying a change in turbine blade fingerprint indicative of blade damage, which comprises a sensor and a processor. Optionally, the data collected may be permanently or temporarily stored on a computer-readable storage medium.

Systems of the invention can comprise one or more sensors for obtaining a signal representing a blade reflection profile from one or more turbine blades passing by the sensors during one or more revolutions of a rotor comprising the blades: This fingerprint data relating to the blades can be collected by the sensors and stored on a computer-readable medium, such as a hard drive, a server, etc. Preferably, the systems comprise at least one computer-readable storage medium in operable communication with the sensors for storing the blade reflection profiles as test data.

In some cases, this stored data can serve as reference data. In the context of this specification, reference data is any data pertaining to information about the blades, such as blade reflection profiles, whether obtained at a time or at a condition of the engine before or after particular test data are obtained. The reference data can be historical data, in that it may be obtained at any point in time prior to the test data, or it can be subsequent data obtained at a point in time after the test data. If test data is obtained after extensive use of the rotor, or after a significant period of time from when the reference data is obtained, then the reference data is referred to as historical data.

The reference data can include data obtained previous and/or subsequent in time to and within a selected window of time of obtaining the test data, such as a time period characterized by nominally unchanged rotor operating conditions. The reference data can also refer to data pertaining to the blades in a healthy or undamaged state. In embodiments, the reference data can be updated with test data that differs from the reference data. This may be performed to update the system so that it accurately reflects a change in blade state, for example, by substituting the reference data with more recent sample data especially where it is known the sample data contains new or changed information about the blades.

The sample data or test data is imported into the system as raw binary data. This data is then prepared and analyzed in accordance with processes of the invention. A processor in operable communication with the storage medium can be used for implementing one or more of the following method steps: (a) preparing the test data for comparison with reference data; (a) aligning, by blade, the test data with the reference data; (c) differencing the reference data and the test data to obtain residuals; and (d) calculating total error from the residuals to identify a change in turbine blade fingerprint indicative of blade damage.

As an initial preparation, the test data can be prepared for analysis by establishing blade window markers to identify the passage events and by eliminating "false" blade windows. Further preparation of the test data may include any type of preparation that facilitates or enables comparison of the test data with the reference data. Such preparations can include one or more of thresholding the test data, interpolating the test data, normalizing the test data to a fixed height, or averaging the test data over a number of revolutions.

Thresholding the test data can comprise isolating blade reflection profiles from background noise to ensure that only data from blades and not noise is being analyzed. This can be accomplished by isolating signals of a certain value that are greater than a selected level. For example, signals can be isolated which have a value greater than a specified standard deviation, such as 1 or 2 standard deviations above the background signal.

Another preparation step that can be performed alone or in combination with thresholding and/or other types of preparation steps is interpolating the data. Interpolating can comprise adjusting the test data to correct for pulse compression or dilation. As the data is obtained over a period of time, the blades are typically not always going to be rotating at the same speed for each and every revolution of the rotor. Consequently, in order to compare the data from revolutions of different speeds, the data should be adjusted to remove the effect speed has on the shape of the pulse. For example, test data obtained from a faster revolution will have a compressed width, which can be adjusted by dilation. Likewise, test data obtained from a slower revolution of the rotor will have an expanded width, which can be adjusted using compression techniques. Additionally, interpolating can involve compressing and compiling the test data into a summary data set comprising a fixed number of test data.

If desired, the data can be prepared by normalizing the test data to a fixed height, or averaging over a number of revolutions. These are independently preferred embodiments of the invention.

Other preparations of the test data can include aligning the data by blade with the reference data. This step is needed to compare changes in one blade observed over several revolutions of the blade past the sensors. Identifying which blade corresponds with which data, and/or patterns in the blade data can be helpful in determining how the data should be aligned. In embodiments, potential ambiguities between blade pairings can be resolved through comparison of the succeeding blades. Alternatively, or in combination with these and/or other methods, alignment of the test data with the reference data can be accomplished by identifying blade numbers using a one-per-revolution (OPR) sensor.

Once the test data is prepared for comparison with the reference data, the systems and methods of the invention can perform the calculation of differencing the reference data and the test data to obtain residuals. Total error is then calculated from the residuals to identify a change in blade fingerprint indicative of blade damage. For example, calculating the total error can comprise squaring and summing the residuals, where a value greater than zero indicates blade damage. Alternatively, total error can be found by summing the absolute value of the residuals, where a value greater than zero indicates blade damage.

The system can further comprise means for correlating the corrected data set against reference data to obtain a correlation coefficient and identify blade offset for one or more blades using the correlation (as provided above):

$$R_{m,n} = \sum_{i=1}^{nVal} \text{Corr}(sig_{m+i}, ref_{n+i})$$

When the test data correlates strongly with the reference data, the blade offset has been correctly identified. Then the test data can be corrected for blade offset by adjusting blade numbers of the test data to align with blade numbers of the reference data and to obtain corrected test data. With the data aligned, proper comparisons can be made between for example blade 1 in trial A with blade 1 in trial B. Combining data over a number of revolutions can establish the overall change in blade fingerprint over the course of all runs being analyzed.

In a test of the system, the system was interfaced with a sensor capable of measuring electromagnetic signals. Although the system is scalable to turbines having a different number of blades, a turbine with 17 blades was used in the test. For the first seven revolutions of the rotor's 17 blades each pulse profile is correlated against each of the previously generated reference set (one of the baseline data sets, chosen at random). This generates a matrix of approximately 14,000 correlations (119×119). In order to isolate the blade fingerprints from the background noise, the data is thresholded to only accept values which are greater than one standard deviation above the average. This data is then interpolated to be expanded to a uniform number of samples. This is preferred in order to be able to reasonably compare fingerprints taken at differing rotational speeds.

Figure 4:
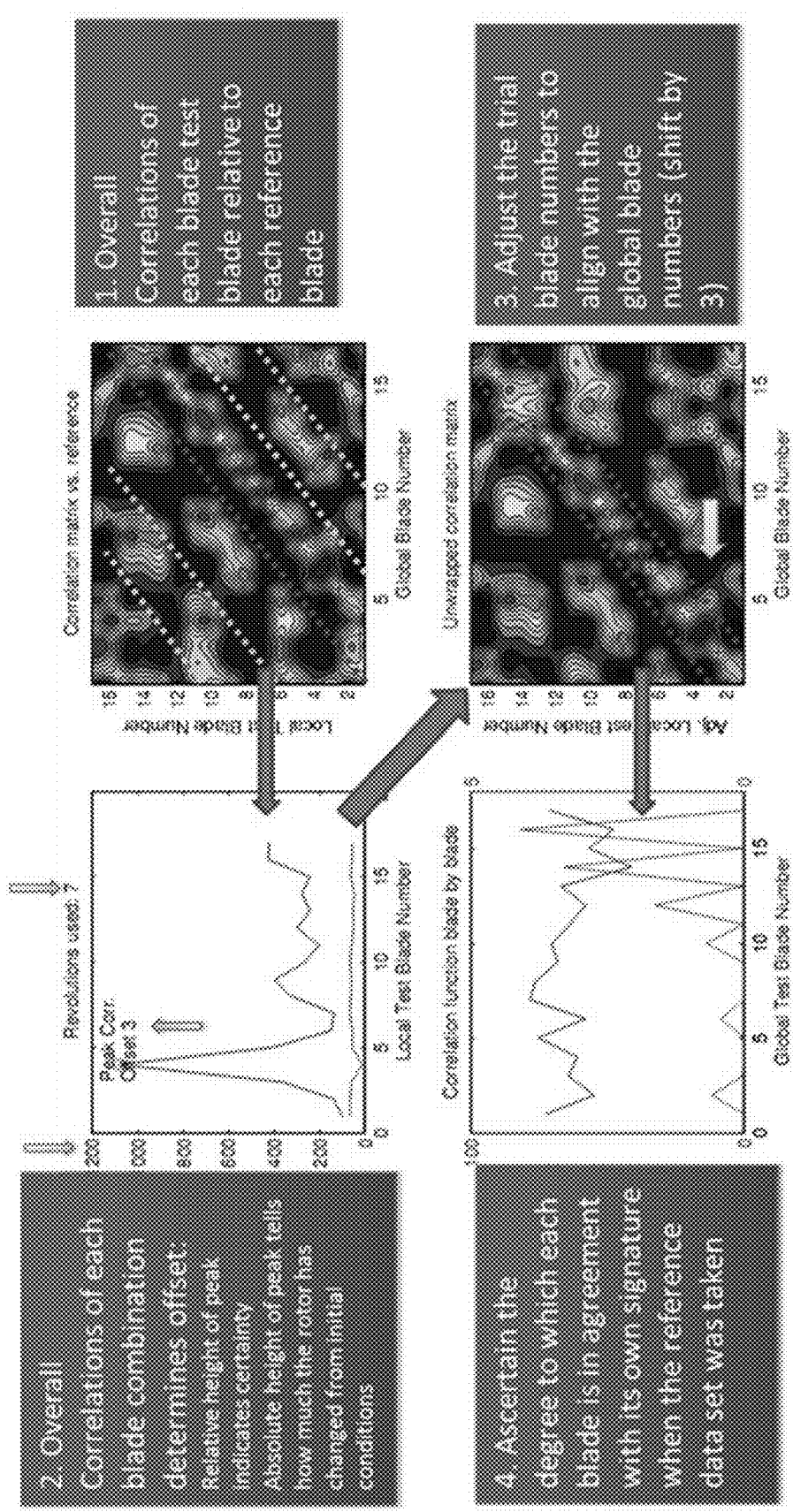
FIG. 4 is a flowchart describing representative blade alignment and fingerprint analysis processes according to embodiments of the invention.

These correlations can then be collapsed by recognizing that the $18^{th}$ blade is also the $1^{st}$ blade on the second revolution, and so on. As a result, the correlations can be reduced to a total of 17×17 summary correlations, as shown in FIG. 4 (step 1: blade alignment and fingerprint analysis). In addition to the calculation of the correlation coefficient between the test data and the reference data, the computations also reveal the statistical likelihood, for each case, that the same results would arise from random chance.

Another aspect of the invention provides a system for identifying blade instability. An unstable blade is one characterized by having a fingerprint that changes within a sampling window proximate the test blade data. Preferably, the reference data in such a situation includes data obtained just prior to the test blade data, and/or data obtained just subsequent the test blade data. This reference data, which is typically obtained over a smaller window as compared with historical data, can be subtracted from the test data (or vice versa) to determine if there are fluctuations in the pulse profile that would indicate the blade is exhibiting an undesirable unstable behavior.

Example II

Blade Identification

Figure 5:
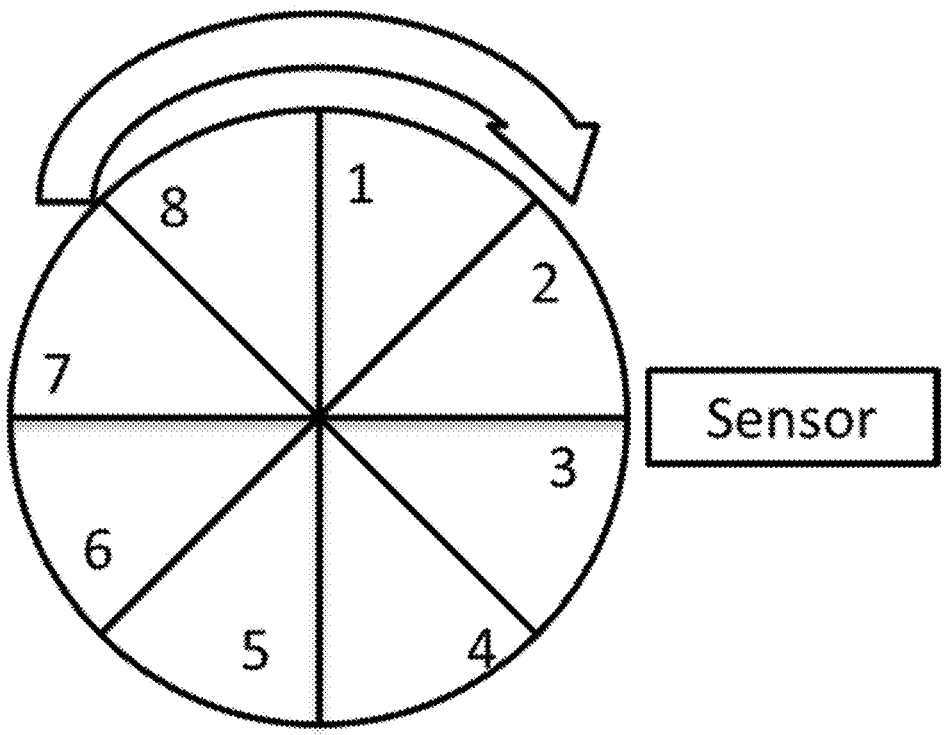
FIG. 5 is a schematic drawing showing numbered blades of a rotor relative to a stationary point of measurement.

There are several related methods for performing blade identification. In embodiments, the data utilized is a time varying optical reflection obtained by observing the blade passing a fixed point, such as a fixed point on the engine case. This is illustrated in FIG. 5. The sensor and system described above is an ideal example of the type of sensor that can be used to generate this waveform.

In most cases the process is simplified by resampling the data into a non-time based sequence. This allows blade data sets to be compared even in cases where the rotor speed is changing between data sets. This can be thought of as being the rotor's global phase angle (0-360 degrees of angular offset relative to an arbitrary starting position), or done locally as a fraction of the local blade width.

Resampling approaches can include a method of determining the number of blades on the rotor and counting the amount of time required for that many blades to pass, $t_{rev}$. In this situation, the phase angle representation is simply $360/t_{rev}$. Another resampling approach comprises starting with the detection of blade edges (such as from the algorithm described above), then resampling each blade to a uniform number of data points. A variant of this second process involves applying binning (aggregation) to the data as a method of resampling to reduce data density and to smooth out local noise.

Blade identification techniques can include performing a brute force correlation or feature extraction of the data. The brute force correlation analysis involves the least amount of ability to characterize the feature of the blades. In this method, each blade of the current data set is compared using a cross correlation computation with each of the stored reference blade profiles. The mathematical definition of the cross correlation is provided as follows, which is the mathematical definition of the cross correlation value of two vectors X and Y:

$$R_{X,Y}(m) = \frac{1}{N-m} \sum_{n=0}^{N-m-1} X_{n+m} Y_n$$

Generally, the cross correlation is a measure of how similar two sets of numerical data are to each other.

Figure 6:
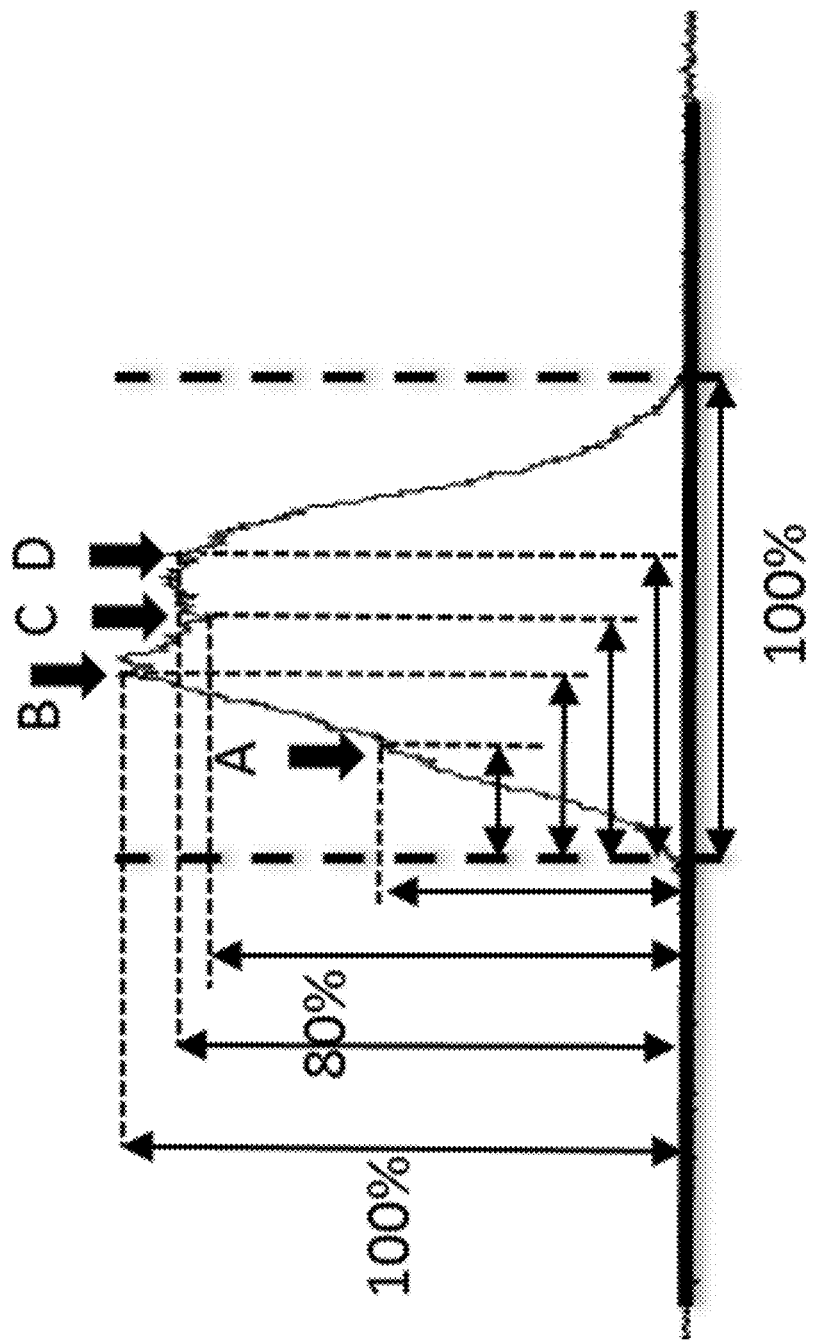
FIG. 6 is a diagram providing a sample blade reflection profile or fingerprint dissected to illustrate a method of feature extraction for blade identification of the invention.

Feature extraction is another method that can be used for blade identification. In this approach, a stage of pre-processing is used to reduce the computational workload relative to that of the brute force method. This method can be thought of as being similar to the approach which is used in modern facial recognition software. Rather than trying to compare every detail of the two data sets, instead a set of defining features are measured and only that subset of the data is compared. An illustration of this pre-processing step is shown in FIG. 6. Four example features are called out in FIG. 6, each of which is labeled by a downward pointing block arrow, and labeled with a letter (A, B, C, or D). A sample description of the features identified in FIG. 6, as well as extracted data is given in Table 1.

TABLE 1

Feature extraction from FIG. 6

| Feature | Feature Type | Extracted Characteristics |
|---|---|---|
| A | Rising edge shoulder | 20% delay from rising edge to falling edge; 50% maximum amplitude |
| B | Global peak | 40% delay from rising edge; 100% of maximum amplitude |
| C | Local minimum | 50% delay from rising edge; 75% of maximum amplitude |
| D | Start of falling edge | 65% delay from rising edge; 80% of maximum amplitude |

Accordingly, the total data set is reduced from thousands of individual data points to a finite number of parameters. In addition to the parameters discussed above, some additional features which can be extracted from this waveform, but which are not called out in FIG. 6 include: rising edge duration, falling edge duration, number of local maxima and minima, time of achieving the half maximum values on the rising and falling edges, and/or the location of the pulse centroid (geometrically weighted average value) relative to the full width half max center (location exactly between the rising and falling crossings of the 50% of maximum value). If all of these parameters, including those identified in FIG. 6 and the additional parameters just discussed, the data set could be reduced to 19 parameters. These 19 parameters can then be compared between the test data set and the reference blade data sets to perform the identification.

Example III

Blade Damage Detection Based on Time of Arrival Analysis

Another method of the invention that can be used individually or in combination with the blade fingerprint and/or blade identification analyses described above is a method for detecting blade damage based on blade time of arrival analysis.

Accordingly, systems and methods of the invention are capable of collecting and deciphering large amounts of timing-related data relating to the blades, e.g., blades on a turbine rotor. In the context of this specification, blades disposed on a rotor has the same meaning as a rotor comprising blades whether the blades are attached to the rotor as a separate entity or whether the blades and the rotor comprise a single integral unit. In embodiments, this is accomplished by analyzing one or more aspects of the pulses reflected from the blades, such as pulse width, rise time, rising edge shoulder, rising edge duration, fall time, start of falling edge, number of local maxima and minima, full width half maximum (FWHM) center, time of achieving the half maximum values on the rising and falling edges, location of the pulse centroid, global peak, and/or local minimum, to name a few.

One or more sensors disposed on or proximate to the turbomachinery is positioned in a manner to collect a signal from each blade as it passes by the sensor(s) during one or more revolutions of the rotor. In preferred embodiments, the systems are capable of collecting any or all of the following information about one or more blades: (a) the absolute time of the rising edge of the pulse; (b) the absolute time of the center of the FWHM (full width at half maximum) distribution; and/or (c) the time of the centroid of the pulse.

Figure 7:
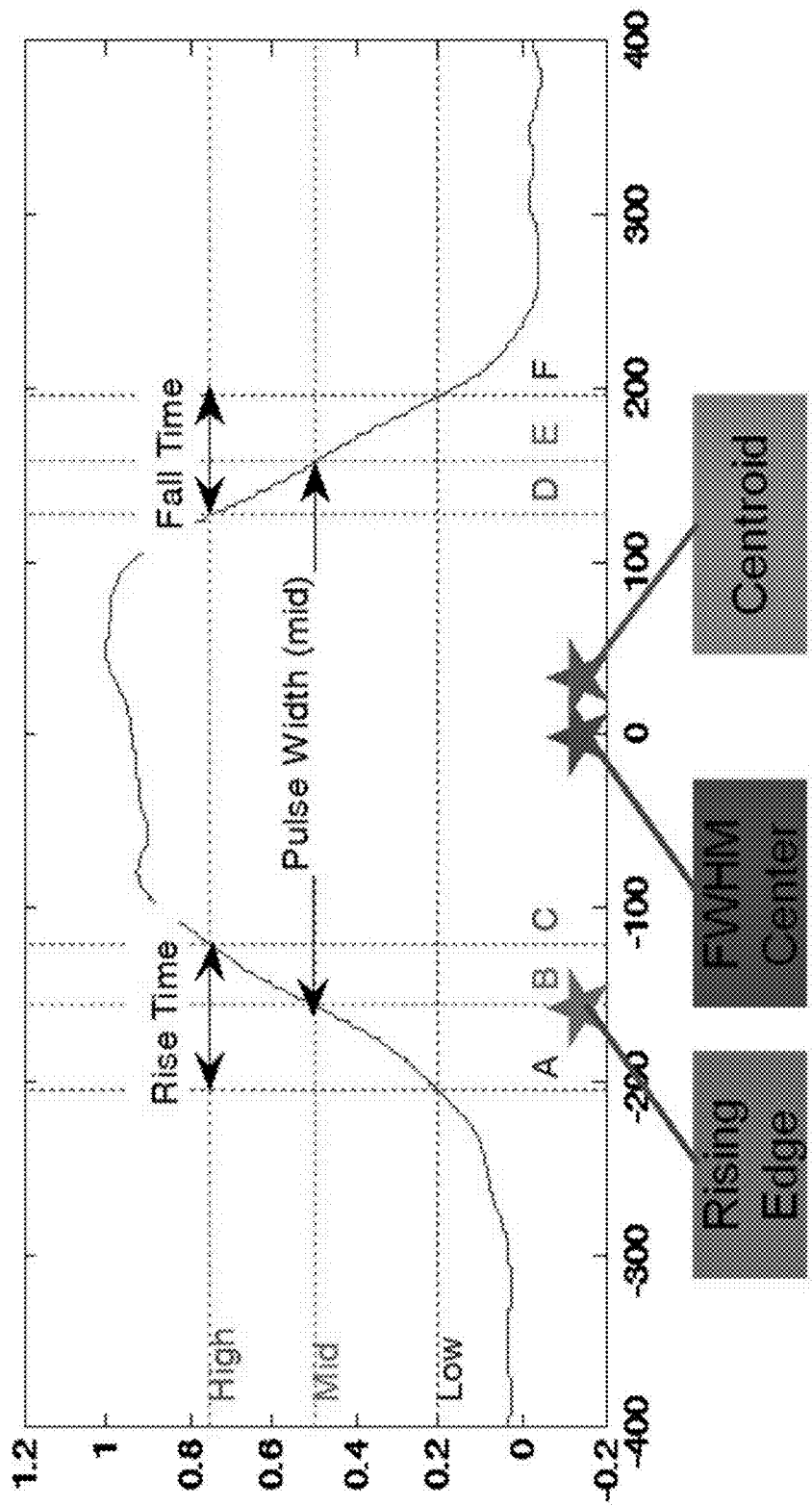
FIG. 7 is a diagram illustrating representative timing features of a blade fingerprint that can be used in calculations to identify FOD.

A graphical representation of exemplary timing features is provided in FIG. 7. As shown in FIG. 7, the rising edge of the pulse is labeled as "B," the FWHM center is defined as 0 (halfway between time markers "B" and "E") in the same plot, and the centroid of the pulse is defined as the weighted average centered time of the pulse.

This information can then be used to make any number of desired timing determinations. For example, one or more of these values corresponding to a particular feature (e.g., rising edge, FWHM, or centroid) can be differenced against the corresponding measurement for the previous blade, the same blade on a previous revolution, and/or the nominal timing for that value (i.e. when the value should have been achieved on a perfect system, such as the expected time based on the average of all other blades on the current revolution). If desired, systems and methods of the invention can be configured to make all nine timing differencing determinations of this particular example.

Figure 8:
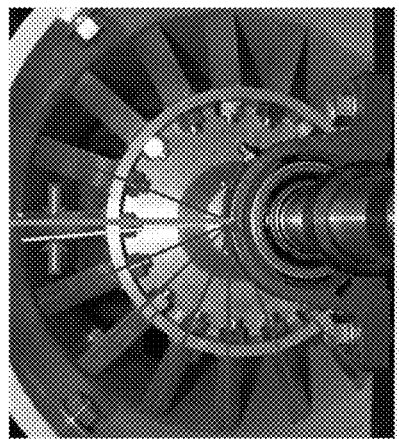
FIG. 8 is a graphical representation of timing references that can be used to compile spectrograms for analyzing changes in blade condition.
Figure 8:
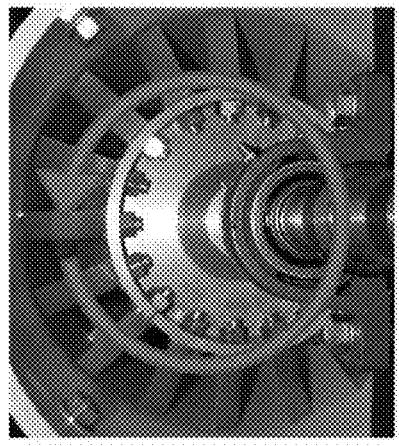
Figure 8:
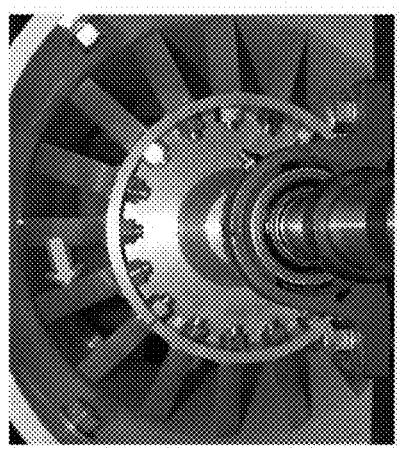

More particularly, the timing intervals are shown graphically in FIGS. 8A-C. As shown, FIG. 8A illustrates the time of the feature from the prior blade, while FIG. 8B illustrates the time from the same feature on the prior revolution, and FIG. 8C illustrates the time of the feature relative to the expected time based on the other blades of the rotor. Additionally, in FIG. 8C, the blue line represents the nominal TOA (time of arrival), which is determined by the timing of the other blades (red lines), whereas the yellow line represents the actual time of arrival, and the difference is the relevant measurement.

According to preferred embodiments of the invention, the systems and methods can be operably configured for determining from a blade pulse of a target blade one or more of: (i) an absolute time of pulse rising edge, (ii) an absolute time of a center of FWHM distribution, and (iii) an absolute time of pulse centroid; and calculating a difference between any of (i)-(iii) of the target blade and that of one or more of: (iv) a previous blade, (v) the target blade on a previous revolution, and (vi) an expected time of the target blade in a particular revolution based on the average absolute times of the other blades in that revolution; and analyzing the difference(s) to identify blade damage. Such methods can also be used in conjunction with the fingerprint analyses or blade identification processes described herein.

Any number and type of statistical analyses can also be incorporated into the systems and methods according to embodiments of the invention. For any of the timing determinations, one or more of the following statistical analyses can be performed, including mean, median, variance, kurtosis, and/or skewness. In embodiments, from this collection of values, a set of statistical measures are generated to summarize the implication of the measurements. The set of statistical measures can include one or more or any of the following: the mean (or average) value, the median, the variance in the values, the kurtosis (which measures how "spiky" a histogram of the data is), and the skew (which measures how lopsided a histogram of the data is). The definition of each of these parameters is given in Table 2.

wider and less distinct frequency bands than a previous spectrogram, or regions of smoothness in a spectrogram not present in a previous spectrogram, either being indicative of blade damage.

Figure 9:
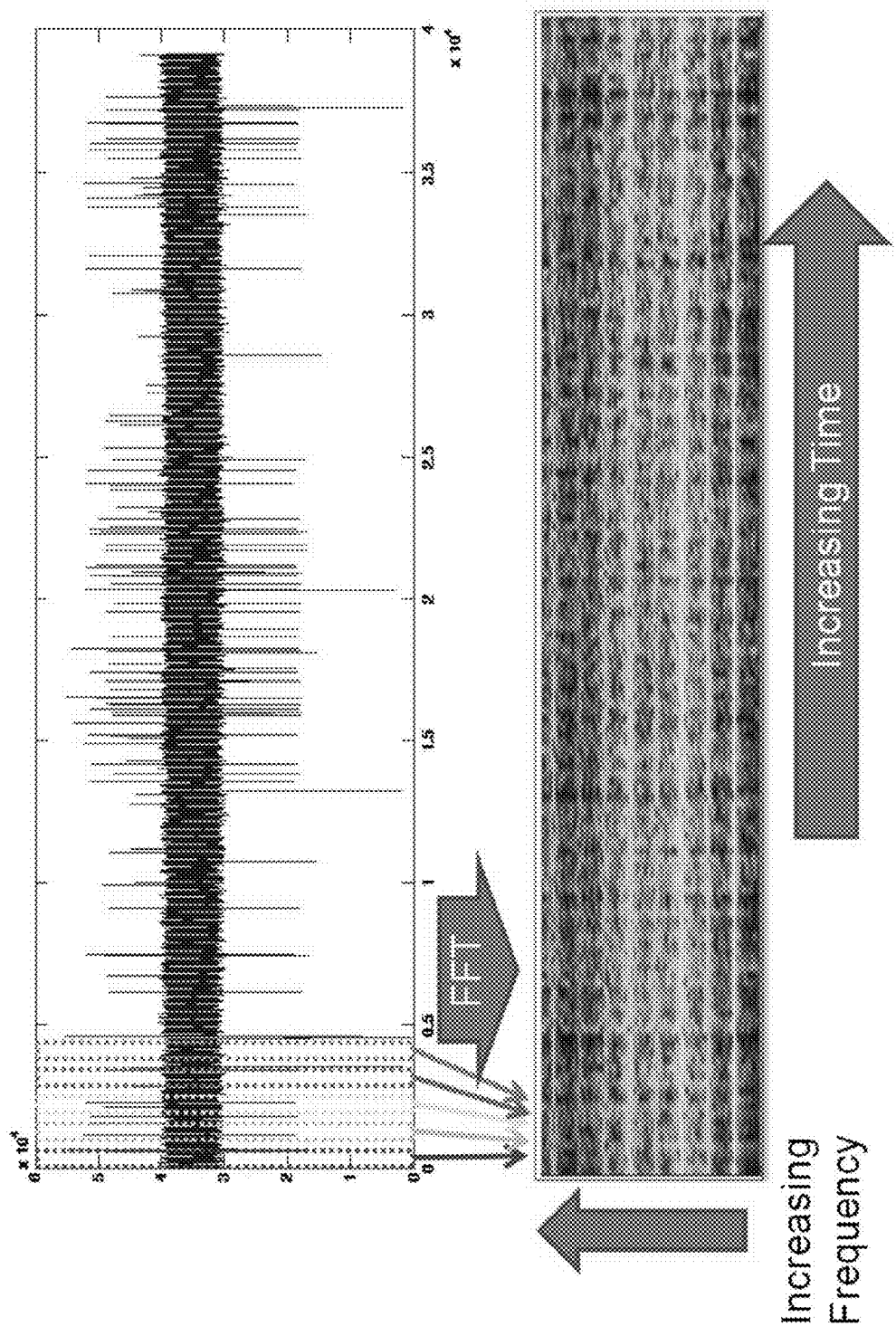
FIG. 9 shows the mathematical process of forming a spectrogram.

The process of forming a spectrogram is illustrated in FIG. 9. As illustrated in the top portion of FIG. 9, steps include identifying and isolating the time domain data to be analyzed. Subsets of the data are taken (as shown by the colored dotted rectangles) and Fourier transformed to create a spectrum. Although not illustrated for clarity, normally the subsets of data are chosen to have overlap between each region. Each Fourier transform then becomes a single vertical stripe of the spectrogram (which is seen in the bottom portion of FIG. 9). For comparison, a spectrogram for a perfect sine wave would consist of a single horizontal line.

Figure 10:
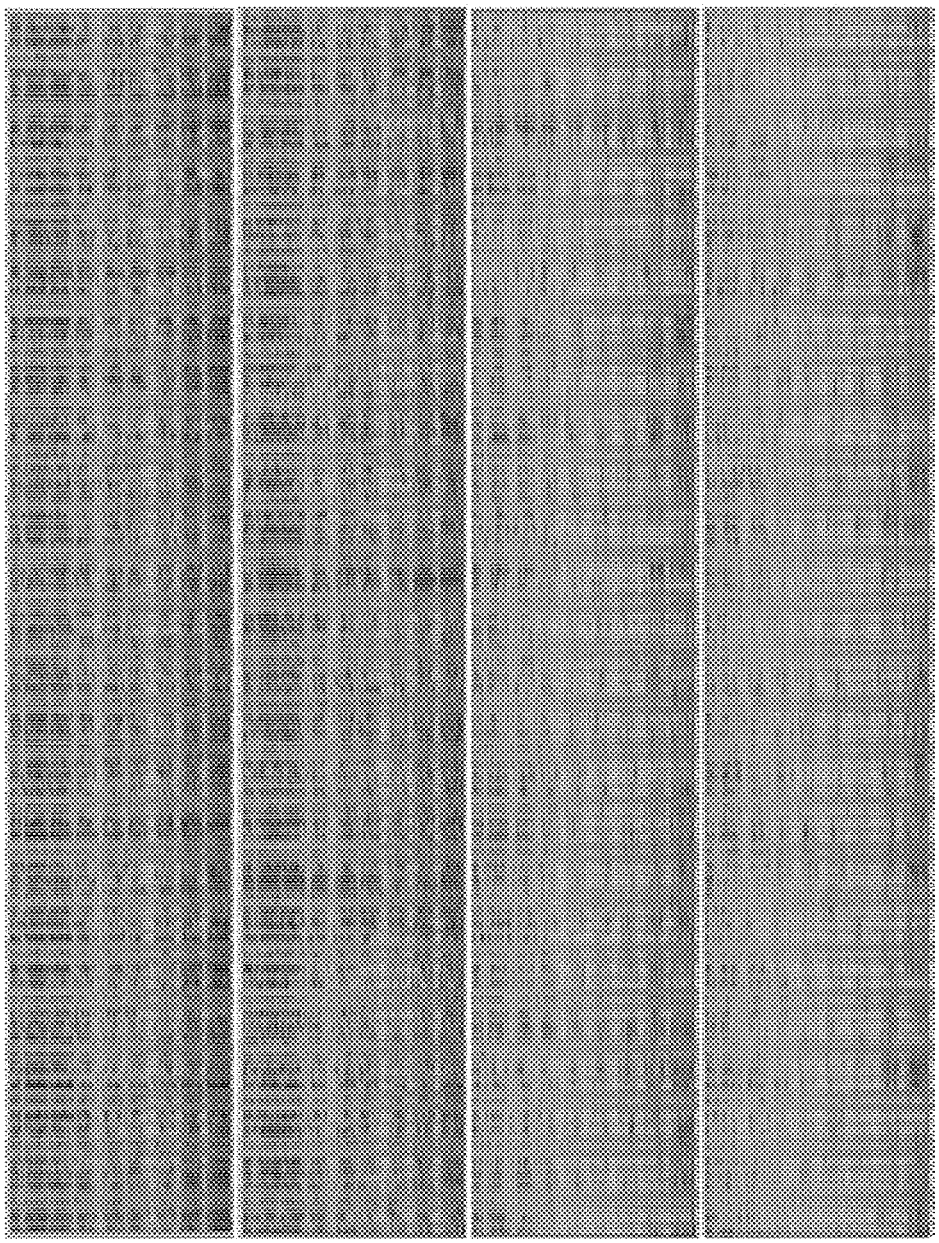
FIG. 10 is a collection of spectrograms comparing the time evolution of the centroid timing for a test condition.

FIG. 10 shows the spectrograms of the data taken from the centroid measurements from each of the various states of FOD as it develops over a period of time. In the top plot of FIG. 10, no FOD is present, which is indicated by a smooth, and relatively clean, distribution of frequency components which does not change appreciably over the duration of the test. The multiple horizontal stripes visible in FIG. 10 are the result of the multiple blade intervals on the rotor. For

TABLE 2

Statistical Calculation Applied to the Timing Measurements.

| | Mean | Median | Variance | Kurtosis | Skewness |
|---|---|---|---|---|---|
| Calculation | $\sum_{i=1}^{n} x_i \over n$ | central value | $\frac{1}{n}\sum_{i=1}^{n}(x_i - \bar{x})^2$ | $\frac{\text{mean}((x_i - \bar{x})^4)}{(\text{var}(x))^2}$ | $\frac{\text{mean}((x_i - \bar{x})^3)}{(\text{var}(x))^{3/2}}$ |
| Measurement | Measure of the central tendency of the distribution | | Measures the spread | Measures the "spikiness" of a | Measures the degree to which a |
| | Significantly influenced by outliers | Not significantly influenced by outliers | (or variability) in the distribution | distribution | distribution is "lopsided" |
| Implication | Indicates cases where a blade has yielded to impact or has its loading significantly altered | Reveals blades which are fluttering | Reveal blades which have a bi-stable or multi-stable motion | Indicates blades having an infrequent but severe deflection | Indicates where a blade has yielded to impact or has its loading significantly altered |

The time evolution of these measurements is also a helpful tool in indicating blade health. According to embodiments of the invention, the systems and methods can comprise means for analyzing whether there is additional meaning in the time/frequency spectrum of the values obtained. Such calculations can include performing a short time Fourier transform (STFT) analysis, the output of which is known as a spectrogram.

Included in embodiments is a system for identifying damage of a turbomachinery blade comprising: (a) one or more sensors for sensing a blade pulse from one or more blades passing by the sensors during one or more revolutions; (b) at least one computer-readable storage medium in operable communication with the sensors for storing data associated with the blade pulses; and (c) a processor in operable communication with the storage medium for performing short time Fourier transform (STFT) analysis of the data to obtain a series of spectrograms and for comparing one or more spectrograms in the series to identify spectrograms with example, there are frequencies which correspond to the interval between adjacent blades. At half that frequency is the response which accounts for the time correlation between each blade and the one two behind it, and so forth.

Progressing downward though the plots in FIG. 10, illustrated is the frequency content of successively increasing degrees of FOD. There are two features of particular interest in these plots. First, in progressing toward the more severe levels of FOD, the clear frequency bands become wider and less distinct. The implication of this is that, as the FOD increases, the blade spacing intervals become more and more irregular.

A second characteristic of interest is that with increasing levels of FOD vertical stripes of darker blue begin appearing in the spectrograms. These vertical stripes are indicative of a much cleaner spectrum occurring for a short period of time. The physical interpretation of this phenomenon is that, at higher FOD levels, the rotor is cycling between a smooth rotation at times (where all the blades are arriving right on time), and a very irregular state, in which the blades are all arriving at a variety of different times relative to the overall rotation of the rotor.

The present invention has been described with reference to particular embodiments having various features. The methods and systems of fingerprint analysis, blade identification, and blade timing differencing as outlined above can be used individually or in any combination for any application where it is desired to determine a change in a moving part. Of particular interest are gas turbine engines used in commercial aircraft, which represent an important commercial market for systems and methods of the invention. Although not typically the victim of FOD, the detection systems of the present invention can also be used for gas turbines used in power generation, where identifying blade integrity issues resulting from erosion or high cycle fatigue could provide cost savings through reduced maintenance costs and the reduction of unnecessary downtime for maintenance. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure are each individually incorporated by reference herein in their entireties.

The invention claimed is:

1. A system for identifying a change in turbomachinery blade fingerprint indicative of blade damage, the system comprising:
    one or more sensors for obtaining a signal representing a blade reflection profile from one or more blades passing by the sensors during one or more revolutions of a rotor comprising the blades;
    at least one computer-readable storage medium in operable communication with the sensors for storing the blade reflection profiles as test data;
    a processor in operable communication with the storage medium for obtaining corrected test data by:
    (a) preparing the test data for comparison with reference data;
    (b) aligning, by blade, the test data with the reference data;
    (c) differencing the reference data and the test data to obtain residuals;
    (d) and calculating total error from the residuals to identify a change in blade fingerprint indicative of blade damage;
    wherein the processor further comprises means for combining or comparing the corrected test data with reference data to identify a change in the blade reflection profile indicative of blade damage, the means comprising:

(a) correlating the corrected test data against reference data to obtain a correlation coefficient $R_{m,n}$ and identify blade offset for one or more blades using the correlation:

$$R_{m,n} = \sum_{i=1}^{nVal} \text{Corr}(sig_{m+i}, ref_{n+i})$$

where Corr ($sig_{m+i}$, $ref_{n+i}$) is a correlation between the corrected test data ($sig_{m+i}$) and the reference data ($ref_{n+i}$) and is defined as:

$$\text{corr}(X, Y) = \frac{\text{cov}(X, Y)}{\sigma x, \sigma y} = \frac{E[(X - \mu X)(Y - \mu y)]}{\sigma x, \sigma y}$$

where E is the Expected Value Operator,
    $\mu_x$, and $\mu_y$ are the expected values (averages), and
    $\sigma_x$, $\sigma_y$ are the standard deviations of data sets X, and Y respectively, and
    (b) further correcting the test data for blade offset to obtain blade-offset corrected test data by adjusting blade numbers of the test data to align with blade numbers of the reference data.

2. The system of claim 1, wherein preparing the test data for comparison with reference data comprises one or more of thresholding, interpolating, normalizing the test data to a fixed height, or averaging over a number of revolutions.

3. The system of claim 2, wherein thresholding comprises isolating blade reflection profiles from background noise.

4. The system of claim 3, wherein thresholding comprises isolating signals having values greater than a selected level.

5. The system of claim 2, wherein interpolating comprises adjusting the test data to correct for pulse compression or dilation.

6. The system of claim 2, wherein interpolating comprises compressing the test data into a summary data set comprising a fixed number of test data.

7. The system of claim 1, wherein aligning, by blade, the test data with the reference data comprises identifying blade numbers using a one-per-revolution (OPR) sensor.

8. The system of claim 1, wherein the processor further comprises means for updating the reference data with test data that is different from the reference data to reflect a change in blade state.

9. The system of claim 1, wherein the reference data comprises historical data obtained previous in time to obtaining the test data.

10. The system of claim 1, which is a system for identifying blade instability, wherein differencing the reference data and the test data comprises differencing data obtained previous and/or subsequent in time to and within a selected window of time of obtaining the test data.

11. The system of claim 10, wherein the selected window of time of obtaining the test data comprises a time period characterized by nominally unchanged rotor operating conditions.

12. The system of claim 1, wherein calculating the total error comprises squaring and summing the residuals, where a value greater than zero indicates blade damage.

13. The system of claim 1, wherein calculating the total error comprises summing the absolute value of the residuals, where a value greater than zero indicates blade damage.

14. The system of claim 1, wherein preparing the test data for comparison with reference data comprises identifying specific features in the test data which are measured for comparison to the reference data.

15. A system for identifying a change in turbomachinery blade fingerprint indicative of blade damage, the system comprising:
one or more sensors for obtaining a signal representing a blade reflection profile from one or more blades passing by the sensors during one or more revolutions of a rotor comprising the blades;
at least one computer-readable storage medium in operable communication with the sensors for storing the blade reflection profiles as test data;
a processor in operable communication with the storage medium for:
(a) preparing the test data for comparison with reference data;
(b) aligning, by blade, the test data with the reference data;
(c) differencing the reference data and the test data to obtain residuals;
(d) and calculating total error from the residuals to identify a change in blade fingerprint indicative of blade damage,
wherein the processor further comprises means for:
(a) determining from a blade pulse of a target blade one or more of:
(i) an absolute time of pulse rising edge,
(ii) an absolute time of a center of FWHM, Full Width at Half Maximum, distribution, and
(iii) an absolute time of pulse centroid;
(b) calculating a difference between any of (i)-(iii) of the target blade and that of one or more of:
(iv) a previous blade,
(v) the target blade on a previous revolution, and
(vi) an expected time of the target blade in a particular revolution based on the average absolute times of all other blades in that revolution; and
(c) analyzing the difference(s) to identify blade damage.

16. The system of claim 15, wherein analyzing the difference to identify blade damage comprises using one or more statistical measures chosen from mean, median, variance, kurtosis, skewness, and short time Fourier transform (STFT) analysis.

17. A system for identifying turbomachinery blade damage comprising:
one or more sensors for sensing a blade pulse from one or more blades passing by the sensors during one or more revolutions;
at least one computer-readable storage medium in operable communication with the sensors for storing the blade pulses;
a processor in operable communication with the storage medium for:
(a) determining from a blade pulse of a target blade an absolute time of a center of FWHM, full width at half maximum, distribution, and calculating a difference between that of the target blade and that of at least one of: (i) a previous blade, (ii) the target blade on a previous revolution, and (iii) an expected time of the target blade in a particular revolution based on the average absolute times of all other blades in that revolution; and/or
(b) determining from a blade pulse of a target blade an absolute time of pulse centroid, and calculating a difference between that of the target blade and that of at least one of: (i) a previous blade, or (ii) the target blade on a previous revolution; and
(c) analyzing the difference(s) to identify blade damage.

* * * * *